United States Patent

[11] 3,628,258

[72] Inventors Alfred H. Schlemmer;
    Melvin A. Pearson, both of Indianapolis, Ind.
[21] Appl. No. 11,724
[22] Filed Feb. 16, 1970
[45] Patented Dec. 21, 1971
[73] Assignee Ralph Hamill
    Indianapolis, Ind.

[54] HEAT TUNNEL FOR SHRINKING PLASTIC JACKETS
    14 Claims, 7 Drawing Figs.
[52] U.S. Cl. .................................................. 34/56, 34/150
[51] Int. Cl. ........................................................ F26b 13/10
[50] Field of Search ............................................ 34/56, 150

[56] References Cited
UNITED STATES PATENTS
| | | | |
|---|---|---|---|
| 2,568,695 | 9/1951 | Bailey | 34/150 |
| 1,128,448 | 2/1915 | Hitchcock | 34/150 |
| 1,668,995 | 5/1928 | Woolever | 34/150 |
| 1,779,622 | 10/1930 | Dreffein | 34/150 |

Primary Examiner—Carroll B. Dority, Jr.
Attorney—Hood, Gust, Irish, Lundy & Coffey ABSTRACT: An apparatus for heat shrinking plastic covers or jackets on planar-shaped articles, such as record albums, comprising an elongated tunnel having an entry end and an exit end and means for serially conveying such articles longitudinally through the tunnel. The conveying means includes endless means arranged to provide at least one run thereof extending longitudinally through the tunnel and, at spaced-apart points therealong, means for engaging such articles and holding them in generally parallel planes extending transversely to their direction of movement through the tunnel. The spaces between the adjacent, parallel articles define a series of generally parallel passages moving longitudinally through the tunnel. Blower means is provided for forcing heated air transversely through the tunnel and in a direction generally parallel to the parallel planes of the articles. The endless means is driven in a step-by-step manner and the means for driving the endless means is controlled by switch means which may be dominated or operated by other apparatus which feeds the articles or by the movement of the articles into the entry end of the tunnel.

INVENTORS
MELVIN A. PEARSON
ALFRED H. SCHLEMMER
BY
Hood, Gust, Irish & Lundy
ATTORNEYS INVENTORS
MELVIN A. PEARSON
ALFRED H. SCHLEMMER
BY Hood, Gust, Irish & Lundy
ATTORNEYS

HEAT TUNNEL FOR SHRINKING PLASTIC JACKETS

It is a primary object of our invention to provide a heat shrink tunnel which is particularly suitable for use in heat shrinking plastic covers or plastic film jackets onto planar-shaped articles, such as record albums. Our heat shrink tunnel has many advantageous features, a particularly advantageous feature being its relatively short length as compared to presently available tunnels having the same capacity. Another particularly advantageous feature of our tunnel is that the means which conveys the planar-shaped articles therethrough is arranged so that the articles are held in such a manner as to define a plurality of generally parallel passageways through which the heated air is moved. A further particularly advantageous feature of our heat tunnel is that the conveying means is driven in a step-by-step manner so that the articles carried thereby are rocked relative to the portions of the conveying means by which they are engaged. This rocking action tends to facilitate the uniform shrinkage of plastic film onto the articles.

Our step-by-step driver for the conveying means is dominated by controls which can be readily used to slave the conveying means to any other device, such as a device which feeds and applies plastic film jackets to record albums. For instance, such controls may include a switch which is operated to start an advancement of the conveying means when a record album appears at a prescribed location. The switch may also be arranged so that it is operated by the cyclic operation of the means which heat seals the plastic film jackets on the record albums.

Those who work with apparatus which uses heated air to shrink plastic film jackets or covers will acknowledge that it is an extremely difficult problem to provide means for adjusting the flow of the air to provide the desired amount of air flow on and heating of portions of the jackets or covers. We have provided an extremely simple, yet effective arrangement for accomplishing this result. Our airflow adjustment arrangement includes a stationary grid through which the air must move and a movable grid which may be held at desired positions relative to the stationary grid.

Other objects and features of our present invention will become apparent as this description progresses.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
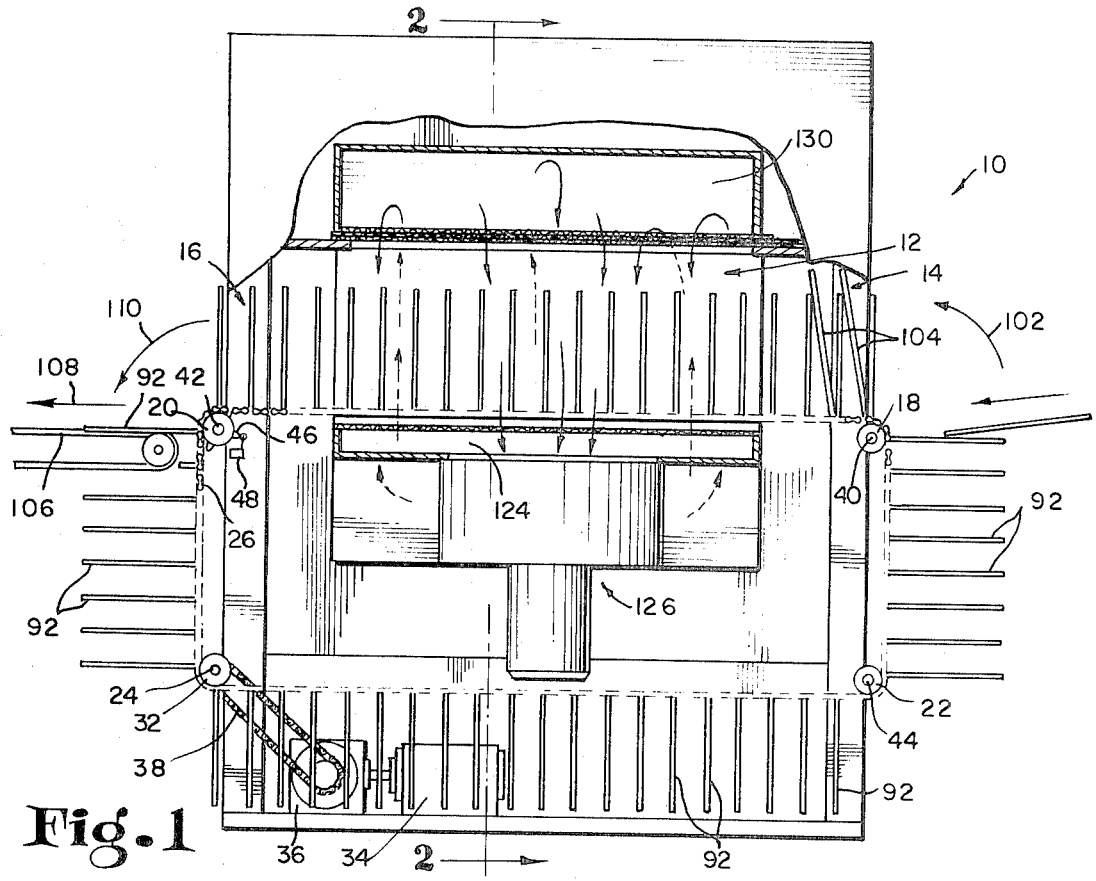
FIG. 1 is an elevational view, partially cut away and sectioned, of our preferred form of heat tunnel.
Figure 2:
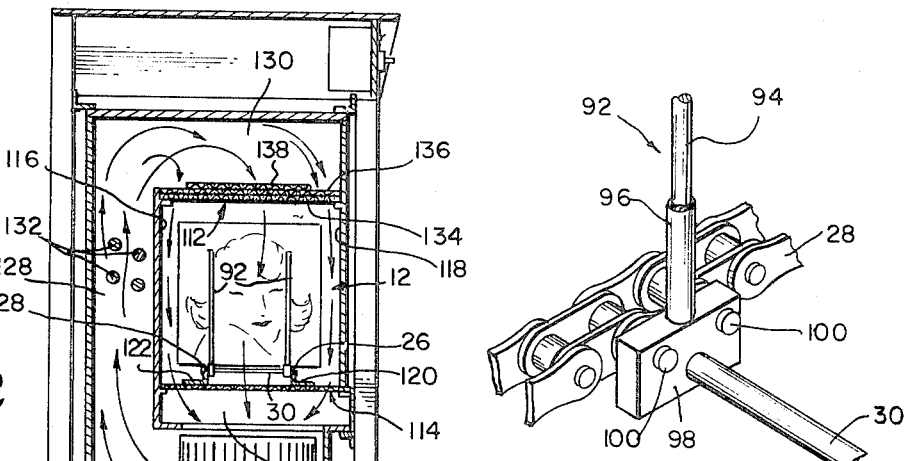
FIG. 2 is a sectional view taken from FIG. 1 generally along the line 2—2 to show the cross-sectional characteristics of the heat tunnel.

Referring particularly to FIGS. 1 and 2, it will be seen that our present invention comprises an apparatus 10 for heat shrinking plastic film covers or jackets on planar-shaped articles, the apparatus comprising an elongated tunnel 12 having an entry end 14 and an exit end 16, and means for serially conveying such articles longitudinally through the tunnel 12, the conveying means being arranged to hold the articles in generally parallel planes extending transversely to their direction of movement through the tunnel. Thus, the spaces between the adjacent articles define a series of generally parallel passages moving longitudinally through the tunnel 12.

As stated previously, our apparatus 10 is particularly suitable for heat shrinking plastic film jackets on record albums, and this description will be of such an application. The applications are, however, not limited to record albums.

The manner in which plastic film jackets may be applied to record albums is fully disclosed in our copending application Ser. No. 8,333 filed Feb. 3, 1970 and titled Feeder And Jacket Applicator. As disclosed in that copending application, it is conventional to apply a plastic film jacket to a record album and then to heat shrink the jacket so that it fits tightly on the album. This jacket protects the record album and it gives the album a pleasing appearance. Such jackets may be fabricated from polyvinyl chloride, polyolefin, polypropylene or other such plastic materials which will shrink when heat is applied thereto. One such film material is manufactured and sold by Dupont under the trademark "Clysar."

The problems involved in shrinking a clear plastic film uniformly onto a record album are many. First of all, heat must be applied in such a manner that the film shrinks uniformly onto the cardboard cover of the album. As disclosed in our said copending application, the plastic film jackets on record albums are formed by heat sealing two plies of plastic film along two or more of the edges of the record album. Such heat sealing of two plies forms what is known in the trade as a bead, i.e., a small ridge or lobe of plastic material, which extends longitudinally along the heat sealed edge. It is desirable to heat shrink the film jacket so that the film will shrink uniformly to draw these beads downwardly onto the adjacent edges of the jacketed record album to extend therealong. In order to accomplish this feat, the heated air should be generally uniformly applied to both sides of the jacket. It is also preferable to provide means for conveying the jacketed albums through the heat tunnel in such a manner that one side of the jacket will not be mechanically constrained at all times while the other side is free to move at all times. Our preferred conveying means is driven in such a manner that the record albums are rocket between two pairs of vertically extending rods each time the conveying means is advanced one step. This rocking movement between the vertically extending rods prevents either side of the jacket from being held mechanically for too great of a period of time.

Our preferred endless conveying means includes a pair of chains, each of which is trained about four sprockets which are rectilinearly spaced apart as best seen in FIG. 1. The chains are laterally spaced apart so that there are two parallel chain runs extending longitudinally through the heat tunnel 12. Specifically, in the illustrative embodiment, we utilize a pair of laterally spaced-apart sprockets 18 near the entry end 14 of the tunnel 12 and another pair of laterally spaced-apart sprockets 20 near the exit end of the tunnel 16. We provide a pair of laterally spaced-apart sprockets 22 below the sprockets 18 and another pair of laterally spaced-apart sprockets 24 below the sprockets 20. The chain trained about the four sprockets 18, 20, 22, 24 to the right as viewed in FIG. 2 is indicated at 26 and the chain trained about the four sprockets 18, 20, 22, 24 to the left as viewed in FIG. 2 is indicated by the reference numeral 28. The two chains 26, 28 are tied together for movement together by means such as the illustrated crossbars 30, a fragment of one crossbar 30 being shown in FIG. 5. The reasons why it is desirable to move the two chains 26, 28 simultaneously together will be better understood as this description progresses.

The two sprockets 24 are mounted on a shaft 32 for rotation therewith. We provide, in the illustrative embodiment, a continuously running drive motor 34 which is drivingly connected to a clutch-brake system 36 which is in turn drivingly connected to the shaft 32 by means of a chain 38. The sprockets 18, 20, 22, are, respectively, mounted on shafts 40, 42, 44 which are journal mounted in the apparatus 10 for rotation about horizontal and parallel axes.

Mounted on the shaft 42, for rotation therewith, is a four lobe cam 46 and mounted adjacent the cam is a switch 48. This switch 48 is a normally closed microswitch which is opened momentarily each time one of the lobes of the cam 46 strikes its actuator. This switch 48 is used in the circuitry shown in FIG. 4 which controls the step-by-step movement of the chains 26, 28.

Figure 4:
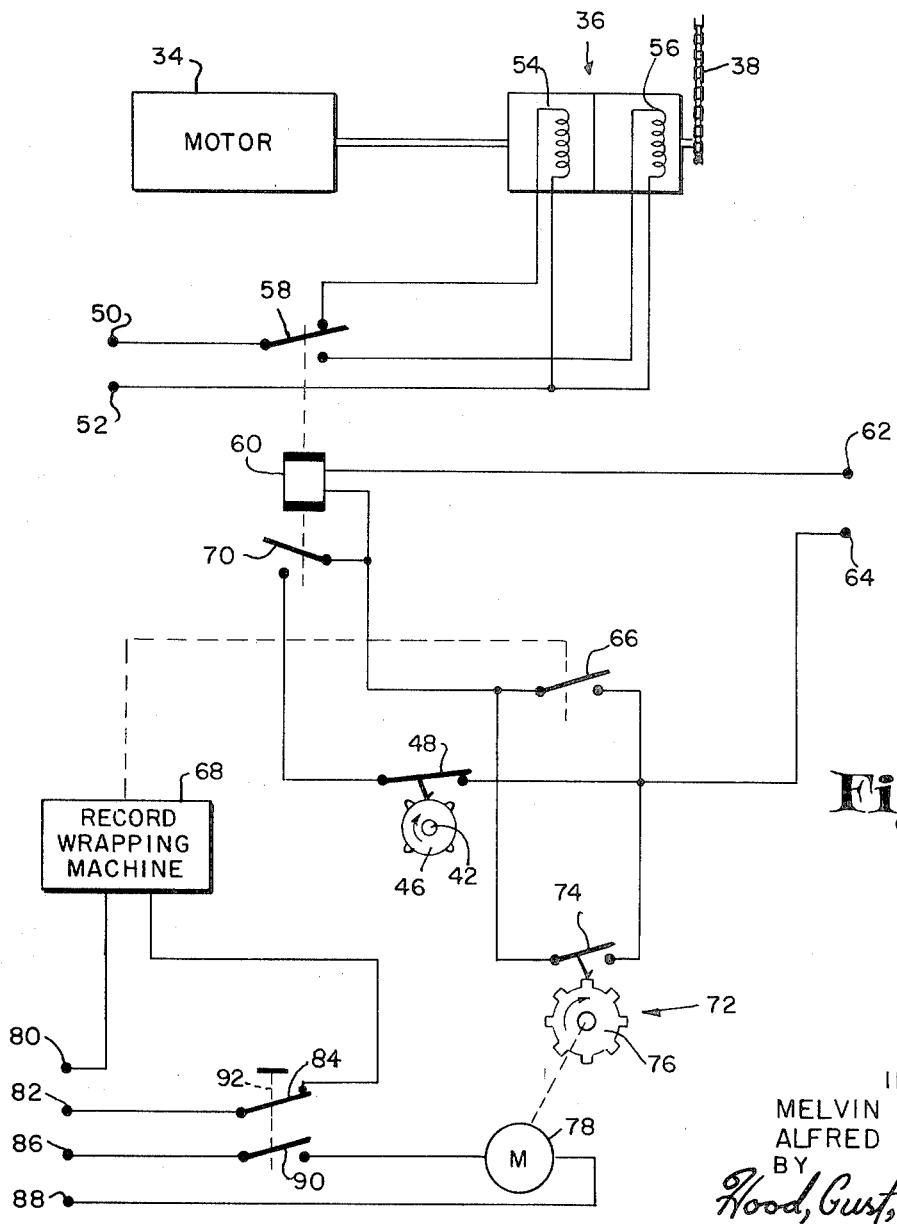
FIG. 4 is a schematic showing primarily the manner in which the drive means for the conveyor of the heat tunnel is controlled.

Referring to FIG. 4 as well as to FIG. 1, it will be seen that, in the illustrative embodiment, the clutch-brake mechanism 36 is supplied with electrical power from terminals 50, 52, the mechanism including a brake coil 54 and a clutch coil 56. The coils 54, 56 are alternately energized through a switch 58 which is a switch operated by a latching relay 60. The latching relay 60 is supplied with power via two terminals 62, 64. Within the circuitry which operates the latching relays 60 is a momentary contact switch 66 which, in the illustration of FIG. 4, is mechanically connected to a record wrapping machine 68. For instance, the switch 66 may be mounted on the machine which applies plastic film jackets to record albums so that it is closed each time a jacket is so applied. In our said copending application, we disclose a record album wrapping machine including rotating seal rollers which separate a moving sleeve of plastic film into individual lengths, each length enclosing a record album. The switch 66 may be operated by a cam which is driven with one of such seal rollers. The switch 66 may be operated also by movement of record albums into the tunnel. That is, the switch 66 may be placed so that each time a record album is fed to the tunnel 12, the album itself will strike the switch momentarily to close it. While we have shown the switch 66 as a conventional contact-type switch, it will be appreciated that this switch may be any type of switch which will sense the movement or appearance of a record album at a particular location. For instance, the switch 66 may be a conventional photoelectric cell used to sense the appearance of a record album.

Once the switch 66 is closed, the coil of the relay 60 is energized to drive its own latching contact 70 closed. Then, when the switch 66 opens, the relay 60 can maintain itself energized by current flow through the contact 70 and the normally closed switch 48. The switch 48 is, however, momentarily opened each time the cam 46 rotates through an angle equal to 90°, this being true because the four lobes on the cam are equally peripherally spaced.

When the coil of the relay 60 is not energized, the switch 58 is in a position normally to energize the brake coil 54. When the coil of the relay 60 is energized, it moves the switch 58 to energize the clutch coil 56. The clutch coil 56 operates a conventional clutch mechanism (not shown in detail) which drivingly connects the motor 34 to the chain 38. Thus, when the clutch coil 56 is energized, the chains 26, 28 are driven. The brake coil 54 operates a conventional braking mechanism (not shown in detail) which prevents further movement of the chain 38 until the mechanism is released, i.e., until the brake coil is deenergized. The clutch coil 56 is, therefore, energized when the relay 60 is energized by the momentary contact switch 66 closing and the brake coil 54 is energized when the switch 46 is opened to deenergize the relay 60. The switch 48 will be opened after the sprockets 18, 20, 22, 24 move through an angle of 90°.

The clutch-brake mechanism 36 is commercially available and well known and need not be described in further detail herein. The brake portion of the mechanism 36 is used by us accurately to position the chains 26, 28 at the end of each step of their advancement.

If, for some reason, the record wrapping machine 68 is turned off and the switch 66 is not periodically closed to operate the drive means for the conveyor of our tunnel 12, the record albums which are left in the tunnel will be ruined by the intense heat which is applied. Thus, we provide a timer 72 which is effective periodically to energize the relay 60 if the means which operates the switch 66 is not operating. In the illustration of FIG. 4, the record wrapping machine 68 is operated by current flowing from terminals 80, 82 through a switch 84. The timer 72 includes a switch 74 which is connected in parallel with the switch 66 and which is operated by lobes on a cam 76 which is driven by a timer motor 78. The timer motor 78 is operated by current flow from power terminals 86, 88 through a switch 90. The two switches 84, 90 are mechanically ties together by means such as indicated at 92 so that when the switch 84 is opened to deenergize the machine 68, the switch 90 is closed to energize the timer motor 78.

We prefer to leave the timer motor 78 energized even after all of the record albums have been advanced out of the tunnel 12 because, as long as the timer 72 is operating, the chains 26, 28 are being driven through the tunnel. This will prevent overheating of portions of the chains 26 28.

Figure 5:
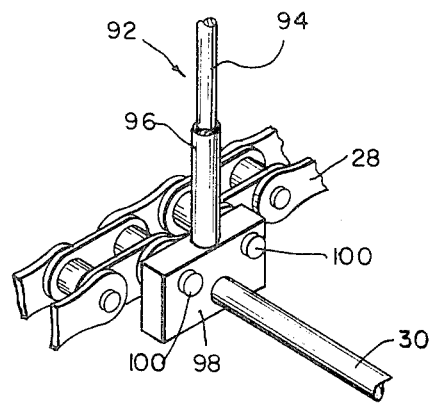
FIG. 5 is a fragmentary perspective view showing a portion of a chain and the manner in which a record album engaging rod is connected to the chain.

A plurality of rods 92 is connected to each chain 26, 28 at spaced apart points therealong. We prefer that the distance between centers of adjacent rods 92 be equal to three links of the chains 26, 28. The reason for this will become apparent as this description progresses. In FIG. 5, we show a portion of the chain 28 and means for connecting a rod 92 to the chain. The illustrative rod 92 is fabricated from a generally straight metal wire 94 which is sleeved with a teflon tube 96 throughout its length. The teflon tube 96 prevents the plastic film of the jackets from contacting the metal surfaces of the wires 94. The illustrative means for connecting each rod 92 to the chains 26, 28 includes a connector block 98 fastened to the chain by means such as indicated at 100, the wire 94 being threadedly engaged with or otherwise rigidly fastened to the block 98. The cross bars 30 which provide connections between the chains 26, 28 may be connected between the blocks 98 as illustrated in FIG. 5.

Thus, each rod 92 on the chain 26 has a mating rod 92 on the chain 28 with which it moves about the rectangular path illustrated in FIG. 1. The two chains 26, 28, in effect, move as one endless means which carries pairs of laterally spaced apart rods 92 which constitute means for engaging the jacketed record albums.

In our preferred embodiment, each of the sprockets 18, 20, 22, 24 has twelve teeth. Thus, when the sprockets are advanced through an angle of 90°, the chains 26, 28 are advanced a distance equal to three chain links. We do this because we prefer that the rods 92 moving up the vertical runs of the chains 26, 28 between the sprockets 18 and 22 extend horizontally as illustrated in FIG. 1. Thus, each laterally spaced-apart pair of rods 92 moving up these vertical chain runs between the sprockets 18, 22 serve as laterally extending fingers or shelves onto which record albums can be generally horizontally fed. We have timed our chain drive mechanism, i.e., oriented the chains 26, 28 and sprockets 18-24, so that each time the chains are advanced, the uppermost pair of rods 92 on the vertical chain runs between the sprockets 18 and 22 move from their horizontally extending positions to vertically extending positions as indicated by the arrow 102. That is, these rods move 90° about the axis of the shaft 40 (sprockets 18) to be vertically extending. We prefer that the rods 92 carried on the chain runs extending between the sprockets 18 and 20 be generally vertically extending as illustrated in FIG. 1. Thus, the rods 92 moving through the tunnel 12 are arranged in vertically extending pairs which are advanced by three link spaces each time that the chains 26, 28 are advanced.

In FIG. 1, we show two record albums 104 disposed between adjacent pairs of rods 92 for movement through the tunnel 12. The movement of the rods 92 through the 90° arc about the axis of the shaft 40 tends to throw the record albums so that they are tilted slightly as indicated in FIG. 1. That is, each album tends to lean forwardly to rest against the upper ends of the pair of rods 92 which are directly ahead of the rods which lifted the album to its vertical position. The bottom edge of the album, however, tends to stay close to the lower ends of the rods 92 which lifted the album to its vertical position with the bottom edge of the album riding on the upper surfaces of the connector blocks 98 for the rods which lifted the album. It will be appreciated, however, that, since the chains 26, 18 are advanced at a rate of, for instance, 120 steps per minute, each step movement will tend to rock the albums from their leaning position as illustrated in FIG. 1 to a generally vertical position parallel with the rods 92 moving through the tunnel 12. This rocking action is believed by us to be very beneficial to the uniform shrinking achieved in out apparatus 10. Specifically, we believe that, when each record album is rocked between two adjacent pairs of rods 92, the plastic film on each side of the album is, for significant periods of time, not in physical contact with any mechanical object which would prevent or restrict its shrinking movement.

The horizontally extending tunnel 12 is defined by upper and lower walls 112, 114 and laterally spaced-apart sidewalls 116, 118 as best seen in FIG. 2. For heat shrinking jackets on record albums which are conventionally square with 12⅜ inches on a side, we prefer that the tunnel be square in cross section with 16¼ inches on each side. We also prefer that the record albums be centered in the tunnel 12 as they move therethrough as illustrated in FIG. 2.

The lower wall or floor 114 of the tunnel 12, which wall may ideally be an expanded metal perforated grid or a woven wire grid, carries a longitudinally extending runner 120, 122 for each chain 26, 28. These runners 120, 122 may be conventional angle irons as best viewed in FIG. 2 with the chains 26, 28 riding, respectively, on the vertically extending flanges of the runners. The purpose of these runners 120, 122 is to keep the chain runs through the tunnel 12 straight and parallel, thereby to keep the rods 92 moving through the tunnel extending vertically upwardly.

Directly below the perforated lower wall 114 is a chamber 124 which preferably extends throughout the length and width of the lower wall to provide an air collection chamber. This chamber 124 is in communication with a blower means indicated generally at 126. We prefer to use a conventional and commercially available squirrel cage-type blower which is driven by a motor to draw air from the tunnel 12 through the perforated floor 114 and chamber 124 into the rotating cage of the blower means from which the air is expelled to an upwardly extending duct 128 disposed to the side of the tunnel 12 as best seen in FIG. 2. Above the upper wall 112 is a passageway 130, this passageway or chamber extends longitudinally and laterally throughout the length and width of the upper wall 112. The upper wall 112 is perforated so that the heated air can move downwardly therethrough. In FIG. 2, we show heating elements 132 disposed in the duct 128 to heat the air moving therethrough.

Figure 3:
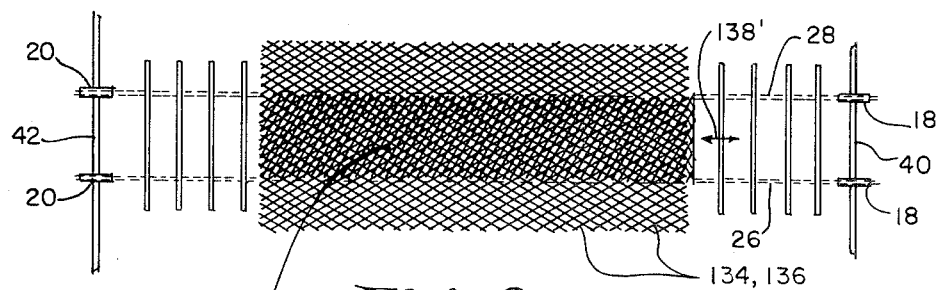
FIG. 3 is a fragmentary, somewhat diagrammatical, elevational view showing our perforated grid arrangement for adjusting airflow.

Referring particularly to FIGS. 2 and 3, it will be seen that the illustrative upper wall 112 is provided by a first rather coarse, i.e., open, perforated grid 134 which provides a structural connection between the walls 116 and 118. Superposed on this grid 134 is another grid 136 which is considerably finer. Then, lying on the upper surface of the perforated grid 136 and extending longitudinally throughout the length thereof is a laterally narrower and even finer grid 138. For all practical purposes, we consider the structural grid 134 to be open, i.e., not to provide too much air blockage or air control. Such a grid, for instance, may be made from a woven wire mesh or by expanded metal techniques to provide openings of considerable size as compared to the amount of wire or mesh extending about the openings. The grid 136, which is 3 feet long and 16¼ inches wide is a considerably finer grid while the grid 138, which is 3 feet long and 8 inches wide, is considerably finer than the grid 136. In our illustrative system, we provide a uniform grid 136 which is a 52 percent open-air grid and a uniform grid 138 which is a 36 percent open-air grid. Further, we place the grid 138 on the grid 136 so that it is centered or generally centered as best seen in FIG. 1 and 3. It will be appreciated that airflow through the combination of the grid 136 and 138 can be controlled by shifting the grid 138 relative to the grid 136. Preferably, the perforations in the grid 136 which are directly below the grid 138 can be substantially closed or blocked by positioning the grid 138 relative to the grid 136. We have tried to illustrate this diagrammatically in FIG. 3, showing that the grid 138 may be moved slightly relative to the grid 136 as indicated by the arrow 138'.

The purpose of the grid 138, which is narrower than the grid 136, is to cause more heated air to flow vertically downwardly through the sides of the tunnel 12 and along the outer, vertically extending edges of the record albums than flows downwardly through the center portion of the tunnel. The plastic jackets on the albums are heat sealed along those vertically extending outer edges by continuously moving two plies of plastic film past two, laterally spaced apart, heat sources such as described in our copending application Ser. No. 8,333 filed Feb. 3, 1970. It is our intent to apply considerably more heat to these vertically extending heat sealed edges than we do to either the upper or lower horizontally extending edges or to the flat surfaces (leading and following sides) of the jackets.

When the tunnel 12 is full of record albums carried on the chains 26, 28 and between the rods 92, the record albums are effective to define a series of generally parallel passages moving longitudinally through the tunnel with the walls of these passages, i.e., the albums, rocking slightly each time the chains 26, 28 are advanced.

Since the albums have a tendency to lean forwardly as described above as they enter the tunnel 12, the vertically downwardly directed heated air initially impinges on the following side of each album more than it does on its leading side. We have observed that this action tends initially to shrink the plastic film on the following sides slightly faster than it does the film on the leading sides. We believe this faster shrinking of the film on the following side of an album tends to pull the album from its leaning position to a more vertically extending position. Therefore, the heated air is forced transversely through the tunnel 12 in a direction generally parallel to the parallel planes defined by this series of slightly leaning and slightly rocking record albums.

While we have found that it is convenient to have the rods 92 spaced apart by three chain links and each sprocket 18–24 to have 12 teeth, it will be appreciated that we can obtain the desired 90° movement of the rods 92 about the sprockets 18 simply by having the sprockets 18 provide teeth in multiples of four and by providing a number of chain links between adjacent rods equal to one-fourth the number of teeth on each sprocket 18.

As stated previously, our apparatus 10 may be slaved to an apparatus which feeds and jackets record albums. Our apparatus 10 can be slaved to a machine which feeds record albums at rates from 100 per minute to, for instance, 160 per minute. The time which each album spends in moving through the tunnel is dependent, therefore, on the rate at which the albums are fed to the apparatus 10. The blower means 126 and heating coils 132 must be sufficient, therefore, to provide enough heated air movement properly to shrink the plastic films. We prefer to use a blower means 126 capable of providing 1,500 cubic feet per minute. We prefer to provide sufficient heater coil 132 capacity to heat the air anywhere from, for instance, 200° F. to 400° F. depending on the type of film being used to make the jackets.

Referring 6 and 7, another embodiment of our present invention will be discussed, this embodiment including an elongated tunnel 160 which is inclined upwardly at an angle of approximately 45°, the tunnel having an entry end as indicated at 161 and an exit end as indicated at 162. The system of FIGS. 6 and 7 includes four chains which will move together, i.e., which are drivingly connected together for corresponding movement, with each of the four chains carrying means for engaging record albums. The four chains, therefore, constitute endless means or carrier means extending longitudinally through the tunnel. The chains are conventionally trained about sprockets which constitute rotor means within the scope of our invention.

Figure 6:
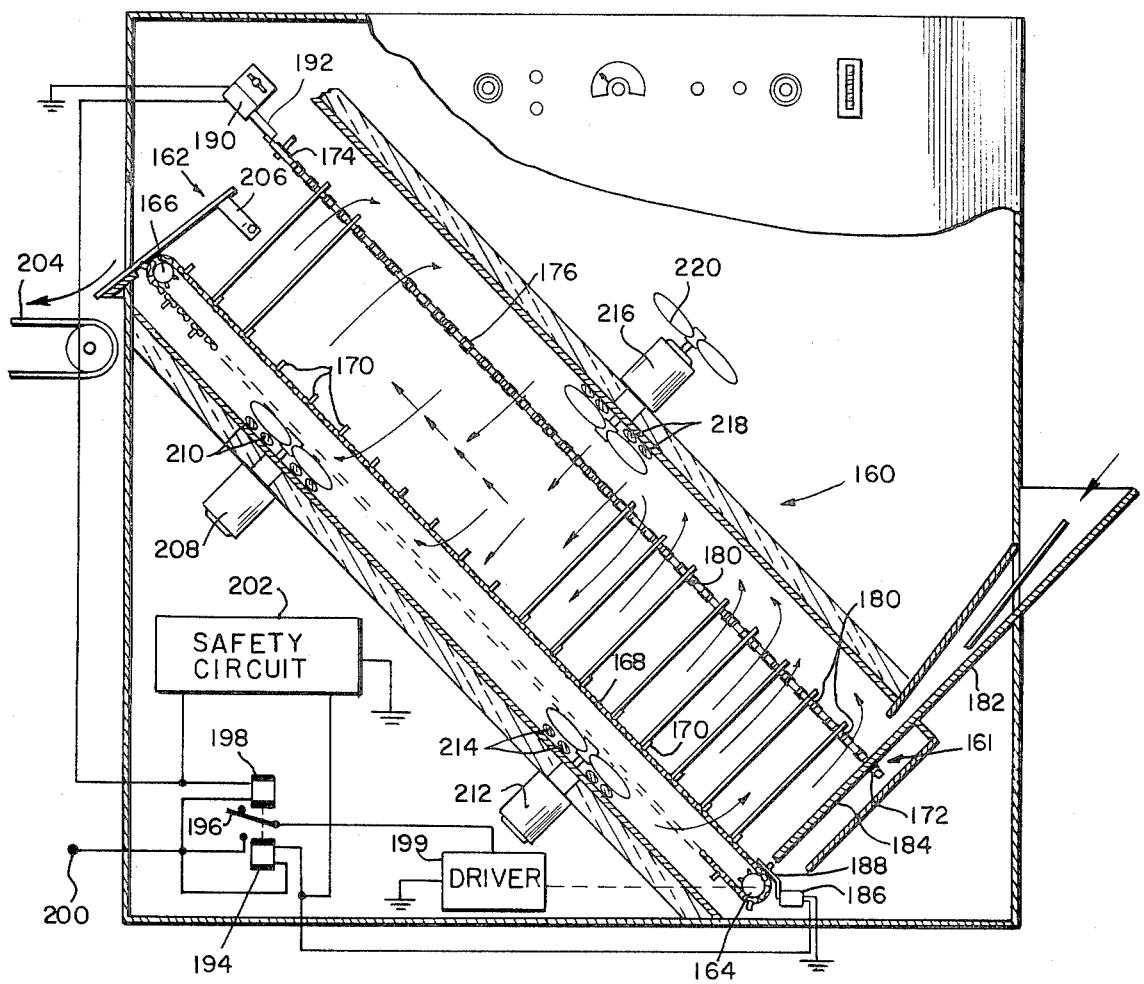
FIG. 6 is an elevational view, partly sectioned and cut away, showing another type of heat tunnel utilizing advantageous features of our present invention.
Figure 7:
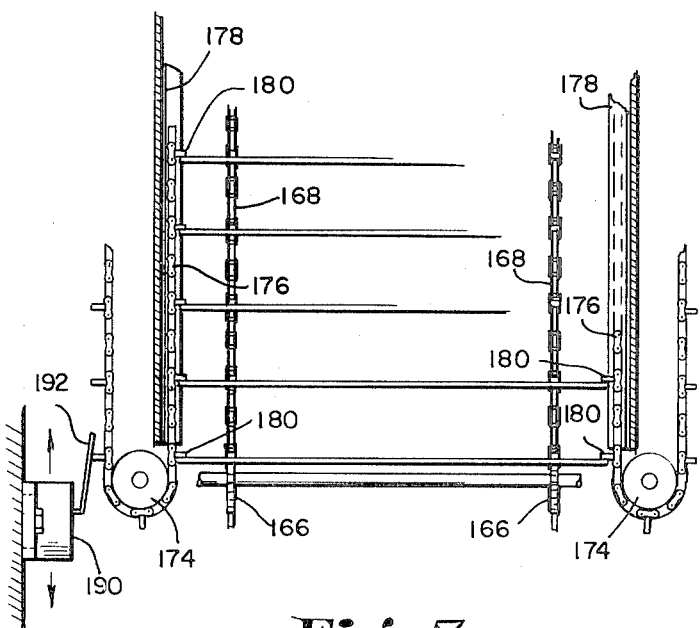
FIG. 7 is an enlarged, fragmentary sectional view looking downwardly at the exit end of the heat tunnel shown in FIG. 6.

In the illustrative embodiment of FIGS. 6 and 7, we provide a pair of laterally spaced apart sprockets 164 journaled for rotation about a horizontally extending axis near the entry end 161 and another pair of laterally spaced apart sprockets 166 journaled for rotation about a horizontal axis near the exit end 162 and a pair of chains 168 trained about these sprockets 164, 166 to provide a pair of laterally spaced apart chains runs extending through the tunnel 160. Each chain 168 carries, at equally spaced apart points therealong, engagers 170.

In the illustrative embodiment of FIGS. 6 and 7, we further provide a pair of laterally spaced apart sprockets 172 journaled, respectively, for rotation about parallel axes which extend perpendicularly to the direction of extension of the tunnel 160 and which are disposed adjacent the entry end 161. We also provide a pair of laterally spaced apart sprockets 174 journaled, respectively, for rotation about parallel axes which, likewise, extend perpendicularly to the direction of extension of the tunnel 160 and which are disposed adjacent the exit end 162. A pair of laterally spaced-apart chains 176 are trained about the sprockets 172, 174 to provide a pair of chain runs extending longitudinally through the tunnel 160 and laterally outwardly from and above the chain runs provided by the chains 168. Each of the chain runs provided by the chains 176 are supported on runners 178 extending longitudinally through the tunnel 160.

The chains 168 and chains 176 are drivingly connected together for movement together through the tunnel 160, the means for connecting these chains for such corresponding movement being conventional and, therefore, not shown in the drawings. Each of the chains 176 carries, at spaced apart points therealong, projecting members 180 which, together with the projecting members 170, engage the record albums. Each album is engaged by a member 170 on each of the chains 168 and a member 180 on each of the chains 176.

The illustrative embodiment of FIGS. 6 and 7 includes means for guiding the record albums into the entry end 161 of the tunnel, this guiding means providing a downwardly extending guide surface 182 which is generally parallel to the planes including the axes of the sprockets 172, 174. The record albums move downwardly along the guide surface 182 which has a lower portion 184 extending downwardly between the chains 178 and above the chains 168 whereby each album disposed against this lower portion 184 is in a position to be engaged by one projecting member 170, 180 on each chain 168, 176.

We provide, in the embodiment of FIGS. 6 and 7, a switch 186 including an actuator 188 which is operated by the movement of a record album to the lower portion 184. We provide another switch 190 which is preferably mounted to be adjustably movable in the direction of extension of the tunnel 160 and which includes an actuator 192 which is operated by the engaging members 180 as they move about the sprocket 174 shown at the lower, left-hand side of FIG. 7. In our illustrative system, the switch 186 energizes a relay coil 194 which operates contacts indicated at 196 while the switch 190 operates another relay coil 198 which, diagrammatically, operates the same switch contacts. The driver for the chains 168, 176 of the embodiment of FIGS. 6 and 7, indicated at 199, is energized by current flow from a terminal 200 through the contact 196. In this illustrative system, when a record album operates the switch 186, the coil 194 is energized to close a circuit between the terminal 200 and the driver 199 to advance the chains 168, 176. When an engaging member 180 operates the switch 190, the coil 198 is energized to break the circuit between the terminal 200 and the driver 199.

In FIG. 6, we show a safety circuit 202 connected across the coils 194, 198. This safety circuit 202 may be the equivalent of the motor-driven timer 72 which is effective to advance the conveying means if, for any reason, records are no longer fed into the entry end 161 to operate the switch 186.

Also in FIG. 6, we show a high-speed conveyor 204 which carries the record albums away from the exit end 162 of the tunnel 160.

In order to keep the record albums which are disengaged, at the exit end 162, by the engagers 170, 180 from falling backwardly into the tunnel 160, we provide a spring-type stop 206 which permits movement of albums therepast toward the exit end 162 only.

In the illustrative embodiment of FIG. 6 and 7, heated airflow is provided by a motor-driven fan 208 and its associated heating coils 210, another motor-driven fan 212 and its associated heating coils 214 and still another motor-driven fan 216 and its associated heating coils 218. The motor-driven fan 216 includes fan blade 220 which is outside the tunnel 160 and which is for the purpose of cooling the cabinetry. The three motor-driven fans 208, 212, 216 are arranged to provide a recirculating flow of heated air through the parallel passages defined by the record albums with the airflow past the albums being generally parallel to the planes defined by the albums.

It will be appreciated that the tunnel 160 could be provided with a recirculating airflow system similar to that used in the apparatus 10 illustrated in FIGS. 114 5, i.e., with a return air duct or passageway such as the passageway 128.

This system of FIGS. 6 and 7 provides the advantageous step-by-step movement of the albums through the tunnel and the albums do define parallel passageways which move through the tunnel and through which the heated air is blown.

What we claim is:

1. An apparatus for heat shrinking plastic covers on planar-shaped articles comprising an elongated tunnel having an entry end and an exit end, means for serially conveying such articles longitudinally through said tunnel, said conveying means including a plurality of rotor means and endless means trained about said rotor means, said rotor means and endless means being positioned so that at least one run of said endless means extends longitudinally through said tunnel, said endless means providing, at spaced apart points therealong, means for engaging such articles and holding them in parallel planes extending transversely to their direction of movement through said tunnel, whereby the spaces between adjacent articles define a series of generally parallel passages moving longitudinally through said tunnel, blower means for forcing heated air transversely through said tunnel and in a direction generally parallel to said parallel planes, said rotor means including, near the entry end of said tunnel, a first pair of laterally spaced-apart sprockets and, near the exit end of said tunnel, a second pair of laterally spaced apart sprockets, said endless means including a pair of laterally spaced-apart chains trained about said sprockets to provide a pair of laterally spaced apart chain runs extending longitudinally through said tunnel from its entry end to its exit end, said chains being connected together for simultaneous movement at the same velocity and in the same direction, and said engaging means including, at equally spaced-apart points along each of said chains, a generally straight rod and means for connecting said rod to said chain so that it will stick outwardly therefrom, said connecting means being arranged so that said rods moving along said chain runs through said tunnel extend upwardly and generally parallel with lateral portions of each such article being carried between adjacent rods on each of said chain runs, said tunnel and said chain runs extending generally horizontally with said rods moving along said chain runs extending generally vertically upwardly, each of said first sprockets having a number of teeth which is a multiple of four, the number of chain links between centers of adjacent rods being equal to such a number of teeth divided by four, and said sprockets being driven in 90° steps to advance said chains through steps equal in length to the spacing between said rods, whereby each rod, as it moves about its associated sprocket of the first pair, will move from a horizontally extending position to a vertically extending position in one step movement, and said conveying means including means for driving said sprockets in said 90° steps and control means for said driving means, said control means including first switch means for starting said driving means to start each such step and second switch means for stopping said driving means to stop each such step.

2. An apparatus of claim 1 in which said first switch means is operated to start said driving means each time such an article is fed to said entry end of said tunnel.

3. An apparatus for heat shrinking plastic covers on planar-shaped articles comprising an elongated tunnel having an entry end and an exit end, means for serially conveying such articles longitudinally through said tunnel, said conveying means including a plurality of rotor means and endless means trained about said rotor means, said rotor means and endless means being positioned so that at least one run of said endless means extends longitudinally through said tunnel, said endless means providing, at spaced-apart points therealong, means for engaging such articles and holding them in parallel planes extending transversely to their direction of movement through said tunnel, whereby the spaces between adjacent articles define a series of generally parallel passages moving longitudinally through said tunnel, blower means for forcing heated air transversely through said tunnel and in a direction generally parallel to said parallel planes, said rotor means including, near the entry end of said tunnel, a first pair of laterally spaced-apart sprockets and, near the exit end of said tunnel, a second pair of laterally spaced apart sprockets, said endless means including a pair of laterally spaced-apart chains trained about said sprockets to provide a pair of laterally spaced apart chains runs extending longitudinally through said tunnel from its entry end to its exit end, said chains being connected together for simultaneous movement at the same velocity and in the same direction, and said engaging means including, at equally spaced apart points along each of said chains, a generally straight rod and means for connecting said rod to said chain so that it will stick outwardly therefrom, said connecting means being arranged so that said rods moving along said chain runs through said tunnel extend upwardly and generally parallel with lateral portions of each such article being carried between adjacent rods on each of said chain runs, said tunnel and said chain runs extending generally horizontally with said rods moving along said chain runs extending generally vertically upwardly, each of said first sprockets having a number of teeth which is a multiple of four, the number of chain links between centers of adjacent rods being equal to such a number of teeth divided by four, and said sprockets being driven in 90° steps to advance said chains through steps equal in length to the spacing between said rods, whereby each rod, as it moves about its associated sprocket of the first pair, will move from a horizontally extending position to a vertically extending position in one step movement, and said conveying means including means for driving said sprockets in said 90° steps and control means for said driving means, said control means including first switch means for starting said driving means to start each such step and second switch means for stopping said driving means to stop each such step, said first switch means being operated to start said driving means each time such an article is fed to said entry end of said tunnel, said second switch means being operated to stop said driving means after said chains have been advanced a distance equal to the distance between said rods.

4. The apparatus of claim 3 in which said driving means includes a continuously running motor, an electrically operated clutch for drivingly connecting said chains to said motor and an electrically operated brake for stopping said chains, said first switch means dominating said clutch and said second switch means dominating said brake.

5. The apparatus of claim 4 in which said tunnel is defined by oppositely facing walls, each of which is perforated, and in which said blower means is arranged to draw air from said tunnel through the perforations in one of said walls and to force air into said tunnel through the perforations in the other of said walls.

6. The apparatus of claim 5 in which said one wall defines the floor of said tunnel and said other wall defines the ceiling of said tunnel, and including a perforated grid lying on said other wall, said perforated grid being effective to block at least partially the flow of air through the portion of said other wall which it overlies.

7. The apparatus of claim 6 in which said other wall and said grid are, respectively, uniformly perforated, said grid being adjustably movable on said other wall to control the flow of air therethrough.

8. An apparatus for heat shrinking plastic covers on planar-shaped articles comprising an elongated tunnel having an entry end and an exit end, means for serially conveying such articles longitudinally through said tunnel, said conveying means including a plurality of rotor means and endless means trained about said rotor means, said rotor means and endless means being positioned so that at least one run of said endless means extends longitudinally through said tunnel, said endless means providing, at spaced apart points therealong, means for engaging such articles and holding them in parallel planes extending transversely to their direction of movement through said tunnel, whereby the spaces between adjacent articles define a series of generally parallel passages moving longitudinally through said tunnel, blower means for forcing heated air transversely through said tunnel and in a direction generally parallel to said parallel planes, said tunnel being defined by oppositely facing walls, each of which is perforated, and said blower means being arranged to draw air from said tunnel through the perforations in one of said walls and to force air into said tunnel through the perforations in the other of said walls, said one wall defining the floor of said tunnel and said other wall defining the ceiling of said tunnel, and including a perforated grid lying on said other wall, said perforated grid being effective to block at least partially the flow of air through the portion of said other wall which it overlies.

9. The apparatus of claim 8 in which said other wall and said grid are, respectively, uniformly perforated, said grid being adjustably movable on said other wall to control the flow of air therethrough.

10. An apparatus for heat shrinking plastic covers on planar-shaped articles comprising an elongated tunnel having an entry end an an exit end, means for serially conveying such articles longitudinally through said tunnel, said conveying means including a plurality of rotor means and endless means trained about said rotor means, said rotor means and endless means being positioned so that at least one run of said endless means extends longitudinally through said tunnel, said endless means providing, at spaced apart points therealong, means for engaging such articles and holding them in parallel planes extending transversely to their direction of movement through said tunnel, whereby the spaces between adjacent articles define a series of generally parallel passages moving longitudinally through said tunnel, blower means for forcing heated air transversely through said tunnel and in a direction generally parallel to said parallel planes, said conveying means including means for driving said endless means in a step-by-step manner to advance such articles through said tunnel, said driving means including control means arranged to operate said driving means to advance said endless means through said tunnel a distance equal to the spacing between adjacent engaging means each time such an article is fed to the entry end of said tunnel.

11. The apparatus of claim 10 in which said control means includes first switch means for starting said driving means when such an article if fed to said entry end and second switch means for stopping said driving means when said endless means is advanced an amount equal to said distance.

12. An apparatus for heat shrinking plastic covers on planar-shaped articles comprising an elongated tunnel having an entry end and an exit end, means for serially conveying such articles longitudinally through said tunnel, said conveying means including a plurality of rotor means and endless means trained about said rotor means, said rotor means and endless means being positioned so that at least one run of said endless means extends longitudinally through said tunnel, said endless means providing, at spaced apart points therealong, means for engaging such articles and holding them in parallel planes extending transversely to their direction of movement through said tunnel, whereby the spaces between adjacent articles define a series of generally parallel passages moving longitudinally through said tunnel, blower means for forcing heated air transversely through said tunnel and in a direction generally parallel to said parallel planes, said rotor means including, near each end of said tunnel, a pair of laterally spaced apart sprockets journaled for rotation about a horizontally extending axis and said endless means including a pair of chains trained about said sprockets to provide a pair of laterally spaced apart runs extending through said tunnel, said tunnel being inclined to extend upwardly from its entry end to its exit end, said rotor means including, near each of said tunnel ends, a pair of second sprockets journaled respectively, for rotation about parallel axes which extend perpendicularly to the direction of extension of said tunnel, said second sprockets near each end of said tunnel being disposed on opposite sides of said tunnel and, respectively, laterally outwardly from and above the first mentioned sprockets disposed at that end, said endless means including a chain trained about said second sprockets disposed on one side of said tunnel and another chain trained about said second sprockets disposed on the opposite side of said tunnel, said engaging means including projecting members carried by said chains at points equally spaced apart therealong, said chains being drivingly connected together for corresponding movement and arranged so that each such article is engaged by one projecting member on each said chain to be held in a moving plane which is generally continuously parallel to the planes including the axes of said second sprockets at each end of said tunnel, and means for guiding such articles into said entry end of said tunnel, said guiding means providing a downwardly extending guide surface which is generally parallel to the planes including the axes of said second sprockets and along which such articles move, said guide surface having a lower portion extending downwardly between the chains trained about said second sprockets and above the chains trained about said first mentioned sprockets whereby each article disposed against said lower portion is in a position to be engaged by one projecting member on each said chain.

13. The apparatus of claim 12 in which said conveying means includes means for driving said chains and sprockets in a step-by-step manner, said driving means including control means arranged to energize said driving means to advance said chains through said tunnel a distance equal to the spacing between adjacent engaging means each time such an article is fed to said entry end.

14. An apparatus for heat shrinking plastic covers on planar-shaped articles comprising an elongated tunnel having an entry end and exit end, blower means for forcing heated air transversely through said tunnel, and means for serially conveying such articles longitudinally through said tunnel, said conveying means including carrier means extending longitudinally through said tunnel, said carrier means including, at longitudinally spaced-apart points therealong, means for engaging such articles and holding them in generally parallel planes extending transversely to their direction of movement through said tunnel and generally parallel to the direction of airflow transversely through said tunnel, said conveyor means including means for advancing said carrier means through said tunnel in steps equal to the spacing between adjacent engaging means, said engaging means being arranged so that such articles are loosely held between adjacent engaging means for movement relative thereto each time said carrier means is advanced.

* * * * *